United States Patent [19]
Garrett

[11] 4,243,065
[45] Jan. 6, 1981

[54] APPARATUS FOR REMOVING GAS FROM A LIQUID

[75] Inventor: Michael E. Garrett, Woking, England

[73] Assignee: BOC Limited, London, England

[21] Appl. No.: 21,661

[22] Filed: Mar. 19, 1979

[51] Int. Cl.³ ............................................ F16K 24/00
[52] U.S. Cl. .................................. 137/171; 137/334; 137/247.33
[58] Field of Search ............. 137/171, 247.11, 247.33, 137/247.41, 251, 254, 170.1, 334

[56] References Cited
U.S. PATENT DOCUMENTS

| 621,998 | 3/1899 | Farley | 137/170.3 |
| 908,651 | 1/1909 | Eichenlaub | 137/247.11 X |
| 3,604,205 | 9/1971 | Geselbracht | 137/207 UX |

*Primary Examiner*—Alan Cohan

[57] ABSTRACT

An apparatus for removing gas from a liquid such as sewage comprises a siphon having a rising leg 2 arranged coaxially within a falling leg 3. Depending into the siphon from a closure member 4 is a skirt 5. A gas extraction pump 6 is in communication with the siphon by means of a tube 7 which extends through closure member 4 at a location outside the skirt 5. Any foam drawn through with gas in the liquid when the pump 6 is operated will have to pass through liquid since the vacuum is drawn from the pump 6 at a location outside the skirt 5.

6 Claims, 1 Drawing Figure

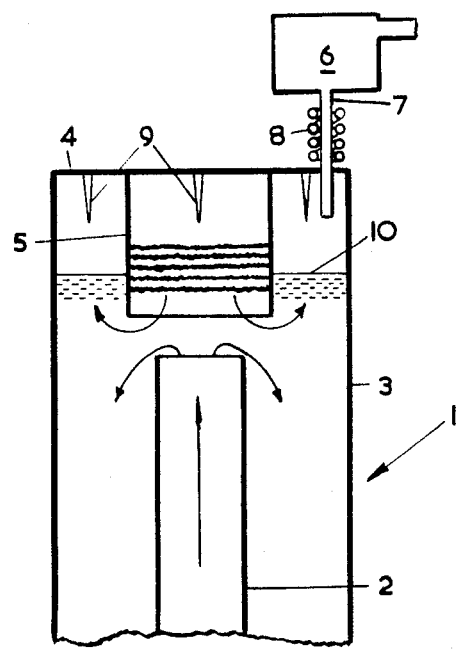

APPARATUS FOR REMOVING GAS FROM A LIQUID

The present invention relates to apparatus for removing gas from a liquid and in particular apparatus for removing gas from waste water such as sewage prior to oxygenation of the sewage.

It is known, to dissolve oxygen, or oxygen-enriched air in waste water to assist in the aerobic treatment of the waste water. Since oxygen or oxygen-enriched air is expensive to produce and is only sparingly soluble in water it is of economic importance that the maximum possible amount of oxygen be dissolved in the waste water with the concomitant minimum wastage of the oxygen or oxygen-enriched air.

It has been proposed to use an apparatus for removing gas from waste water prior to oxygenation of the waste water thereby to increase the space available for the subsequently dissolved oxygen.

According to the present invention, an apparatus for removing gas from a liquid comprises a siphon having a rising leg and a falling leg, a skirt descending into the siphon from an upper closure member, the skirt being positioned immediately opposite the upper part of the rising leg and a gas extraction pump in flow communication with the siphon by means of a tube extending through the closure member at a location outside the skirt.

Preferably, the rising leg is arranged coaxially within the falling leg for at least the upper portion of its length.

In a preferred embodiment, means for heating a portion of the tube is provided.

Preferably, sharp piercing means are attached to the closure member which piercing means point downwardly into the siphon.

An embodiment of the invention will now be described, by way of example, reference being made to the FIGURE of the accompanying diagrammatic drawing.

As shown, an apparatus 1 for removing gas from a liquid such as raw sewage comprises a siphon having a rising leg 2 and a falling leg 3. The rising leg 2 is arranged coaxially within the falling leg 3 at least for the upper portion of its length. Descending into the siphon from a closure member in the form of a top plate 4 is a skirt 5 which is positioned immediately opposite the upper part of the rising leg 2. A gas extraction pump 6 is in flow communication with the siphon by means of a tube 7 which extends through the top plate 4 at a location outside the skirt 5. A portion of the tube is provided with heating means 8.

A plurality of sharp piercing means in the form of stainless steel pins 9 are attached to the top plate 4 and are directly downwardly into the siphon.

In operation, a vacuum is applied by the pump 6 to the upper part of the siphon and raw sewage passes up the rising leg 2 to the level indicated by the reference numeral 10. Gases present in the sewage are largely voided in the upper part of the rising column of sewage. The reduced pressure in the vacuum space above the liquid level 10 at the top of the siphon will tend to cause stable foam and crusted floc to be formed which could choke the apparatus. However, since the vacuum is drawn from the pump 6 at a location outside the skirt 5 any foam drawn through with the gases will have to pass through liquid.

By providing the heating means 8 around a portion of the tube 7 any foam in the tube 7 can be eliminated by elevating the temperature of the tube 7 so that the foam attached to the wall of the tube 7 is caused to boil and break.

Raw sewage frequently contains sheath type contraceptives which are made of rubber or rubber-like material. It sometimes occurs that after use and prior to disposal, people knot the open ends of the sheaths so that small quantities of gas are retained within the sheaths. If such knotted sheaths find themselves at or adjacent the vacuum space in the upper part of the siphon they expand to the size of balloons and can quickly fill the vacuum space thereby reducing the effectiveness of the apparatus. By means of the stainless steel pins 9 any inflated sheaths are caused to rupture and thereby sink and be carried through the main flow of the sewer.

The above described embodiment offers the advantage that prior to oxygenation sewage is degassed which thereby increases the space available for subsequently dissolved oxygen.

Furthermore, it overcomes the practical disadvantage of stable foam and crusted floc and other foreign matter such as contraceptive sheaths reducing the efficiency of the apparatus.

I claim:

1. An apparatus for removing gas from a liquid comprising a siphon having a rising leg and a falling leg, a skirt depending into the siphon from an upper closure member, the skirt being positioned immediately opposite the upper part of the rising leg and a gas extraction pump in flow communication with the siphon by means of a tube extending through the closure member at a location outside the skirt.

2. An apparatus as claimed in claim 1, in which the rising leg is arranged coaxially within the falling leg for at least the upper portion of its length.

3. An apparatus as claimed in claim 1 in which means is provided for heating the tube.

4. An apparatus as claimed in claim 1, in which sharp piercing means are attached to the closure member which piercing means point downwardly into the siphon.

5. An apparatus for removing gas from a liquid comprising a siphon having a rising leg and a falling leg, the rising leg being arranged coaxially within the falling leg for at least the upper portion of its length, a skirt depending into the siphon from an upper closure member, the skirt being positioned immediately opposite the upper portion of the rising leg, sharp piercing means being attached to the closure member and pointing downwardly into the siphon, and a gas extraction pump in flow communication with the siphon by means of a tube extending through the closure member at a location outside the skirt.

6. An apparatus as claimed in claim 5, in which means is provided for heating the tube.

* * * * *